United States Patent
Antypas, III

(10) Patent No.: US 8,719,568 B1
(45) Date of Patent: May 6, 2014

(54) SECURE DELIVERY OF SENSITIVE INFORMATION FROM A NON-COMMUNICATIVE ACTOR

(75) Inventor: John Antypas, III, Pittsburg, CA (US)

(73) Assignee: Cellco Partnership, Basking Ridge, NJ (US)

( * ) Notice: Subject to any disclaimer, the term of this patent is extended or adjusted under 35 U.S.C. 154(b) by 211 days.

(21) Appl. No.: 13/174,039

(22) Filed: Jun. 30, 2011

(51) Int. Cl.
*H04L 9/32* (2006.01)
*G06F 11/00* (2006.01)

(52) U.S. Cl.
USPC .............................................. 713/168; 726/22

(58) Field of Classification Search
USPC ........................................................ 713/168
See application file for complete search history.

(56) References Cited

U.S. PATENT DOCUMENTS

| | | | |
|---|---|---|---|
| 6,178,506 B1 * | 1/2001 | Quick, Jr. | 713/168 |
| 6,769,060 B1 * | 7/2004 | Dent et al. | 713/168 |
| 7,269,256 B2 * | 9/2007 | Rosen | 380/44 |
| 7,447,903 B2 * | 11/2008 | Sandhu et al. | 713/155 |
| 7,865,943 B2 * | 1/2011 | Hayler et al. | 726/6 |
| 8,131,784 B1 * | 3/2012 | Zhuge et al. | 707/823 |
| 8,397,059 B1 * | 3/2013 | Ferguson | 713/155 |
| 2006/0272024 A1 * | 11/2006 | Huang et al. | 726/26 |
| 2010/0235635 A1 * | 9/2010 | Kshirsagar et al. | 713/168 |
| 2011/0078442 A1 * | 3/2011 | Gong et al. | 713/168 |
| 2011/0264913 A1 * | 10/2011 | Nikander et al. | 713/168 |
| 2012/0066763 A1 * | 3/2012 | McHugh et al. | 726/22 |
| 2012/0159161 A1 * | 6/2012 | Seo et al. | 713/168 |

* cited by examiner

*Primary Examiner* — Cordelia Zecher
*Assistant Examiner* — Abdullah Almamun

(57) ABSTRACT

An electronic storage in a network accessible server securely stores sensitive user data. Technologies disclosed enable secure user access to the sensitive data stored in a user account from a client device associated with the user account. Other technologies disclose detecting a specified condition or event, sending a notification to a proxy associated with the user account upon detecting the condition or event, and granting access to the sensitive user data by a client device of the proxy upon authentication of the proxy's client device.

18 Claims, 5 Drawing Sheets

SECURE DELIVERY OF SENSITIVE INFORMATION FROM A NON-COMMUNICATIVE ACTOR

TECHNICAL FIELD

Exemplary techniques and equipment are disclosed for authenticating a client device and establishing a trusted connection between the client device and a network accessible server that maintains secure storage of sensitive data for a user of the client device. Also disclosed are exemplary techniques and equipment for providing a secure electronic storage for sensitive information to a client device, and opening the electronic storage to one or more proxies for the user of the client device, e.g. if it is determined that the user has gone missing.

BACKGROUND

In recent years, individuals have increasingly been relying on electronic storage to store and preserve sensitive information. While sensitive information was customarily preserved in paper format, and was therefore readily passed on to an heir or other representative upon an individual's passing or disappearance, electronic documents may not readily be transferable. The electronic documents may be securely encrypted, password protected, or protected from unauthorized access in other ways, and may therefore be inaccessible without a password. The electronic documents may also be stored on any number of devices and servers, in any number of user accounts serviced by different providers, and identifying and locating a particular individual's electronic documents can therefore prove to be a herculean task.

Traditionally, individuals preserved sensitive documents in hard-copy, paper, or other physical format (e.g., a disk, DVD, or portable storage device), and stored the documents with a family attorney or in a safe-deposit box at a financial institution. In the event of the individual passing or disappearance, the individual's heir, attorney, or other representative was able to gain access to the physical documents. The individual was therefore able to preserve the documents in utmost secrecy and security, but to nonetheless ensure that the documents would be released to selected person(s) in the event that the individual passed away, became unavailable, or became incompetent to grant such release authorization.

No electronic equivalent to the safe-deposit box exists. Much of an individual's life is now scattered among various storage systems, secure or not. In the event that the individual goes missing, passes, or loses mental capacities, tracing the individual's electronic content across a variety of systems, logins, passwords and other credentials is likely to be a daunting task.

Hence a need exists for an electronic equivalent to a safe-deposit box in which an individual can arrange to have any sensitive materials stored in a secure facility, and released to a representative party under specified conditions. As a corollary, there are related needs for providing security with respect to access to the sensitive materials by the individual and/or by agents or proxies designated by the individual to access the materials in the event that the principal individual is in some way unavailable. Similar security needs may arise for other services or applications.

SUMMARY

The teachings herein alleviate one or more of the above noted problems by authenticating a client device and establishing a trusted connection between the authenticated client device and a network accessible server that maintains secure storage of sensitive data for a user of the client device. In addition, the teachings alleviate one or more of the above noted problems by providing a secure electronic storage for a user, and enabling the electronic storage to be opened by one or more proxies for the user of the client device under specified conditions, such as upon determining that the user of the client device has gone missing.

In a first example, a method or system authenticates a client device and establishes a trusted connection between the authenticated client device and a network accessible server that maintains a secure electronic storage of sensitive user data for a user of the client device. A random number is generated in response to an attempt to access the sensitive user data in the secure electronic storage from the client device. A first encryption is performed by encrypting the random number with a first key of a first key pair, and a second encryption is performed by encrypting a result of the first encryption with a first key of a second key pair. The result of the second encryption is transmitted via the network to the client device and, in response to the transmission, a number is received from the client device. If the received number matches the random number, it is determined that the client device decrypted the result of the second encryption using the second keys of the first and second key pairs to recover the random number, and a communication session is established through the network between the server and the client device, for the client device to access the sensitive user data in the secure electronic storage.

Using the keys of the first and second key pairs stored by the server and the client device, the server can authenticate the client device through the comparison of the encrypted random number transmitted to the client device, and the decrypted number received from the client device. If the numbers match, the server establishes a communication session between the server and the client device.

A method and system for granting access to a secure network storage to a client device maintains a secure electronic storage of sensitive user data in a network accessible server. Data identifying a proxy for the user is stored in a manner available to the server. User access to the sensitive user data in the secure electronic storage is monitored and, based on the monitoring, a condition or event matching a pre-defined notification rule is detected. Upon detecting the condition, a notification message is generated and sent through the network to a client device of the identified proxy, a secure communication procedure is conducted between the server and the client device to validate the client device as a device of the identified proxy, and access to the sensitive user data in the secure electronic storage is granted to the client device through the network upon successful validation of the identified proxy.

As a result, the identified proxy can be granted access to sensitive information upon detection of a specified condition such as, for example, the user of the client device failing to access the data in the secure electronic storage during a determined period of time.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various methods and systems disclosed herein relate to providing secure electronic storage for a user's sensitive data by using double-encryption and related examples of connection authentication for automatically granting access to the sensitive data by a client device of a user or of a proxy designated by the user for access upon occurrence of pre-defined conditions.

Figure 1:
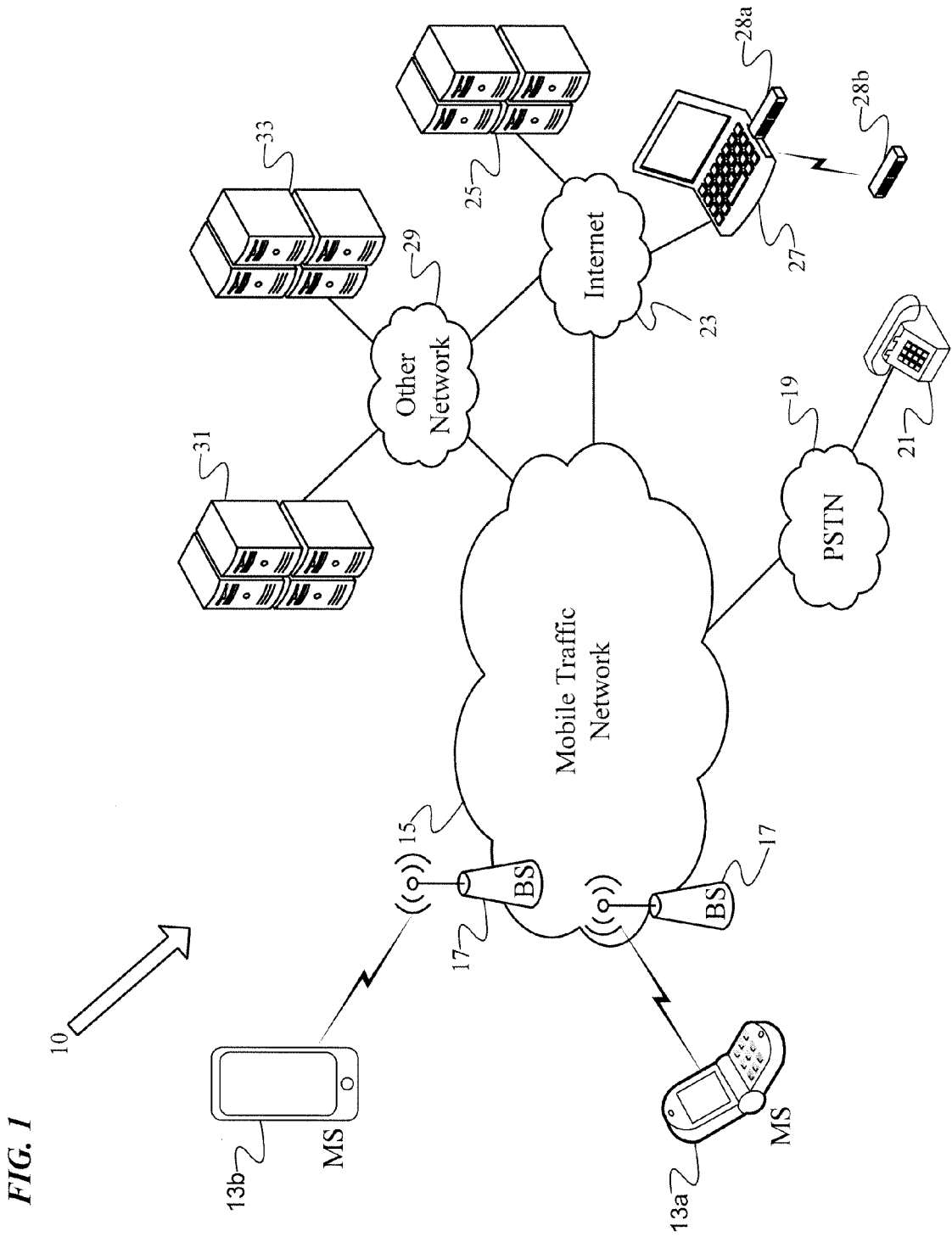
FIG. 1 is a high-level functional block diagram of an example of a system of networks/devices that provide various communications for mobile stations and support an example of the secure electronic storage service.

Reference now is made in detail to the examples illustrated in the accompanying drawings and discussed below. FIG. 1 shows a high-level functional block diagram of an example of a system of networks/devices that provide various communications for client devices such as mobile stations and computer terminals and support an example of the secure electronic storage service.

FIG. 1 illustrates a system 10 offering a variety of mobile communication services, including communications for securely accessing an electronic storage by users of client devices. The example shows simply three client devices, including two mobile stations (MSs) 13*a* and 13*b* communicating through a mobile communication network 15 and a personal computer (PC) terminal 27 communicating through a wired or wireless network represented generally by the Internet 23. In the example, the secure electronic storage service is provided by a server 31, which is in communication with the client devices (13*a*, 13*b*, 27) through one or more wired or wireless networks 29, 23, and 15. Server 31 provides functionality to maintain a secure storage for sensitive user data, to create and maintain user accounts, to communicate with and establish connections with client devices, to authenticate client devices seeking access to the sensitive user data, and to monitor for pre-defined conditions and grant access to the user data to client devices of proxies upon occurrence of the pre-defined conditions. Each functionality of server 31 may result from a program running on server 31.

Alternatively, the secure electronic storage service can be provided by multiple servers such as servers 31, 33, and 25 forming a server system. In implementations having multiple servers, the servers of the server system can each have specialized functions (e.g., account server, application server, storage server, or authentication server) resulting from specialized programs running on each server, or the servers can form part of a distributed server system in which programs, applications, and functionalities are run in a distributed fashion across multiple servers (e.g., as account, application, storage, or authentication server applications running in distributed fashion on one or more servers of the server system).

The program data, user account data, sensitive user data, and other data required for the operation of the secure electronic storage service is stored in one or more storage devices accessible by the hardware platforms programmed as respective server(s) and requiring the data for operation. The storage devices may be in or co-located with the respective servers or accessible by the respective servers through the communication network. The sensitive data stored by users in the users' accounts is stored in a secure electronic storage device or system. A secure electronic storage is one that imposes restrictions on access to the storage and to the sensitive data stored therein. Security and access restrictions include allowing only authorized users to access the storage and the sensitive data, and blocking access by unauthorized users. The security and access restrictions rely on various methods to provide secure electronic storage including authentication of users seeking access to the storage, authentication of the client devices used for access to the storage, required use of particular client devices to access the storage, encryption of data stored in the storage system and of data communicated to/from the storage system.

The storage device or system can further be made secure by taking measure to ensure the physical security of the system (e.g., by physically shielding the system from theft, by controlling physical access to the system), the integrity of the system (e.g., by protecting the system from damage or failures caused by heat, water, environmental conditions, or natural disasters, or), and the electronic security of the system (e.g., by protecting the system from hackers, rogue employees, or other unauthorized access), and otherwise protect the system and data from hazards or events that would compromise the integrity of the stored data or result in unauthorized access to the data.

The mobile stations 13*a* and 13*b* and PC type terminal 27 are examples of client devices that may be used for establishing a connection with and accessing the secure electronic storage service. However, the network will provide similar communications for many other similar users with other types of client devices as well as for mobile devices/users that do not participate in the secure electronic storage service. The network 15 provides mobile wireless communications services to those stations 13*a*, 13*b* as well as to other mobile stations (not shown), for example, via a number of base stations (BSs) 17. The network 23 provides wired or wireless communications services to those terminals 27 as well as to other computers and terminals (not shown). The present techniques may be implemented in any of a variety of available mobile networks 15, wired or wireless network 23, and/or on any type of mobile station or other client device terminal compatible with such networks 15 or 23, and the drawing shows only a very simplified example of a few relevant elements of the networks 15 and 23 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The exemplary mobile stations 13 are capable of voice telephone communications through the network 15. The stations 13 and other types of mobiles stations support data communications (alone or in addition to voice communication) through the particular type of network 15 (and the users thereof typically will have subscribed to data service through the network). At least the mobile stations like 13a and 13b of users subscribing to the secure electronic storage service use the data communication capability of the network for client-server communications of the secure storage service.

In general, the network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile stations 13 via the network 15 and the Internet 23 may be with devices like those shown at 25 and 27 as well as with a variety of other types of devices or systems capable of data communications through various interconnected networks. For purposes of further discussion of the secure storage service, the mobile stations 13a and 13b and the terminals 27, of users of the secure electronic storage service, also can receive and execute applications written in various programming languages including a client application for the secure service, as discussed more later.

Mobile stations 13 and terminals 27 can take the form of portable handsets, smart-phones, personal digital assistants, tablet devices, workstations, or personal computers, although they may be implemented in other form factors. Program applications, including an application to assist in the secure electronic storage service can be configured to execute on many different types of mobile stations 13 or terminals 27. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13, can include one or more RANs and a regional circuit and/or packet switched network and associated signaling network facilities. A regional portion of the network 10, such as that serving terminal 27, can include one or more wired or wireless LANs and associated signaling network facilities.

Physical elements of a RAN operated by one of the mobile service providers or carriers, include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13, when the mobile stations are within range. Each base station can include a BTS coupled to several antennae mounted on a radio tower within a coverage area often referred to as a "cell." The BTS is the part of the radio network that sends and receives RF signals to/from the mobile stations 13 that are served by the base station 17.

The radio access networks can also include or interconnect via a traffic network represented generally by the cloud at 15, which carries the user communications and data for the mobile stations 13 between the base stations 17 and other elements with or through which the mobile stations communicate. The network can also include other elements that support functionality other than data services, such as messaging service messages and voice communications. Specific elements of the network 15 for carrying the voice, messaging, and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that support the secure storage service and/or provide ancillary functions in support of the communications services and application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well.

The secure electronic storage service may be hosted or provided on application server 31. Application server 31 may implement some or all functionalities of the storage service, including but not limited to the storage of data, the creation and management of user accounts, the authentication of client devices and granting of access to storage services, the monitoring for pre-defined conditions, the granting of access to client devices of proxies, and other functionalities for providing the storage service. In the example discussed herein, application server 31 performs substantially all server functionalities involved in providing the secure storage service. However, in other examples, functionalities can be implemented on multiple servers of a server system (e.g., servers 31, 33, and 25), either as server applications running in a distributed fashion across one or more servers of the server system, or as server application running on separate, specialized servers of the server system. For example, the server system can include a secure storage server or application, configured to maintain secure storage of sensitive user data; a user account storage server or application, configured to store user account and configuration data; an account server or application, configured to create and manage user accounts; an authentication server or application, configured to generate encryption key pairs and to encrypt and decrypt data and communications using the key pairs; and/or an application server or application, configured to provide the secure storage service and coordinate the operation of servers of the server system in providing the service.

A mobile station 13 communicates over the air with a base station 17 and through the traffic network 15 for various voice and data communications, e.g. through the Internet 23 with a server 25 and/or through network 29 with the carrier's application servers 31, 33. A terminal 27 communicates through the network 23 for various data communications, e.g. with servers 25 and/or through the network 29 with servers 31, 33.

If a mobile service carrier offers the secure electronic storage service, the service may be hosted on a carrier operated application server 31, for communication via the networks 15 and 29 for mobile station users and through the Internet network 23 for servicing users on other client devices like 27. Alternatively, the secure electronic storage service may be provided by a separate entity (alone or through agreements with the carrier or service provider), in which case, the service may be hosted on an application server such as server 25 connected for communication via the networks 15 and 23. Servers such as 25 and 31 may provide any of a variety of common application or service functions in support of or in addition to any client application program running on the mobile station 13 and/or terminal 27. However, for purposes of further discussion, we will focus on functions thereof in support of the mobile secure electronic storage service. For a given service, including the secure electronic storage service, an application program within the mobile station or terminal may be considered as a 'client' and the programming at 25 or 31 may be considered as the 'server' application for the particular service.

Also, for further discussion of an example, we will assume that the platform 31 runs the server programming for the secure storage service. The computer platform has or as access to one or more physical data storage devices for storing the user data and/or for storing the relevant programming executed by the processor(s) of the platform to provide the functions of or associated with the storage service.

To insure that the application service offered by server 31, in this case the secure storage service, is available to only authorized devices/users, server 31 additionally performs authentication server functions by, e.g., running an authentication server program. Alternatively, the provider of the secure storage service may deploy a separate authentication server to perform the authentication functions. Essentially, when the server application (server 31 in our example) receives a service request from a client application on a mobile station 13 or terminal 27, the server application provides appropriate information to the authentication server application running on server 31 to allow the server application to authenticate the mobile station 13 or terminal 27 as outlined herein. The authentication by the server 31 is used here for the secure storage service, although those skilled in the art will appreciate that the platform may provide similar authentication related functions with respect to other services or network hosted applications. To complete the authentication, the authentication server program may alternatively or additionally need to authenticate a removable client device 28a or 28b, e.g., a USB key, which is in wired or wireless communication with terminal 27, or access information either stored on removable device 28 or stored directly in a memory of mobile station 13 or terminal 27. The mobile station 13, terminal 27, or removable device 28 is generally referred to as a "client device" or "user device" hereinafter. The client device generally includes a physical hardware device. In one example, however, the client device is a software device, such as an application running on mobile station 13 or terminal 27 or stored on removable device 28, which securely stores a unique identifier for the software device along with the information described hereinafter as being stored on a client device (such as encryption keys, key pairs, and/or FIFO buffers) and is configured to receive and transmit encrypted objects, perform encryption and decryption, and implement other functions of a client device as described hereinafter. In another example, a client device is formed by a combination of one or more hardware and software devices.

Upon successful authentication, the authentication server application informs the server application 31, which in turn provides access to the service via data communication through the various communication elements (e.g. 29, 23, 15 and 17) of the network 10. A similar authentication function may be provided for secure electronic storage service(s) offered via the server 25, either by the server 31 if there is an appropriate arrangement between the carrier and the operator of server 25, by a program on the server 25 or via a separate authentication server (not shown) connected to the Internet 23.

The enhanced secure electronic storage service under consideration here may be delivered to touch screen type client devices (e.g., touch screen enabled mobile stations, tablet PCs, etc.) as well as to non-touch type client devices (e.g., non-touch type mobile stations, PCs, and other terminals). Hence, our simple example shows the mobile station (MS) 13a as a non-touch type mobile station, the mobile station (MS) 13b as a touch screen type mobile station, and the PC type terminal 27 as a non-touch type terminal. Implementation of the on-line secure electronic storage service will involve at least some execution of programming in the client device (mobile station or terminal), as well as implementation of user input/output functions and data communications through the networks 15, 23, and/or 29, from the client device.

Figure 2:
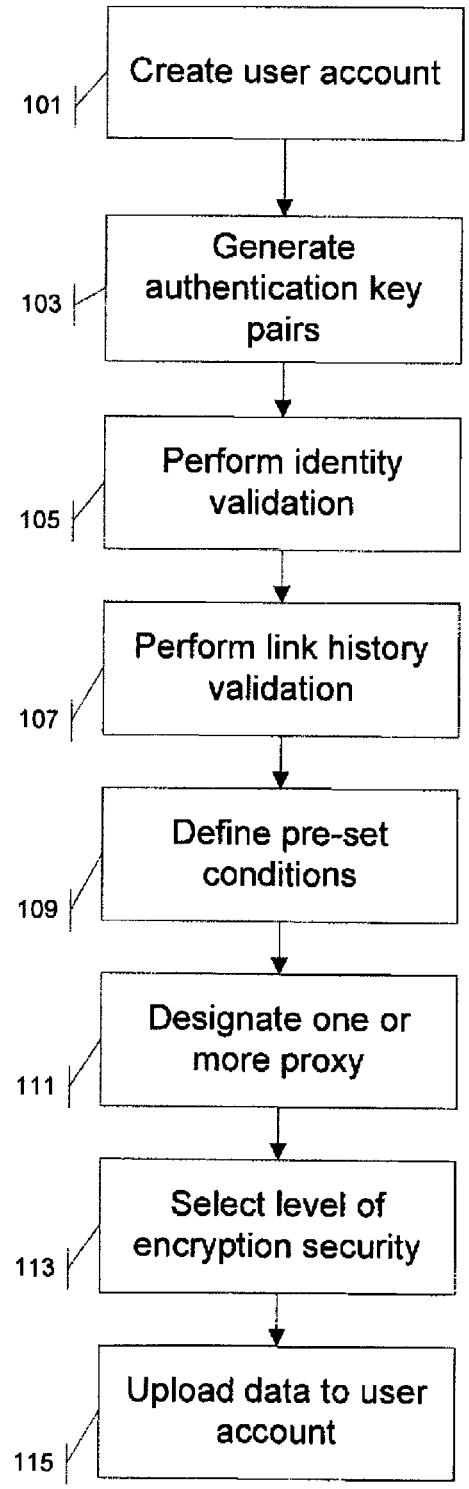
FIG. 2 is a flow diagram illustrating a procedure for creating an account for a user associated with a client device on a network accessible server.
Figure 3:
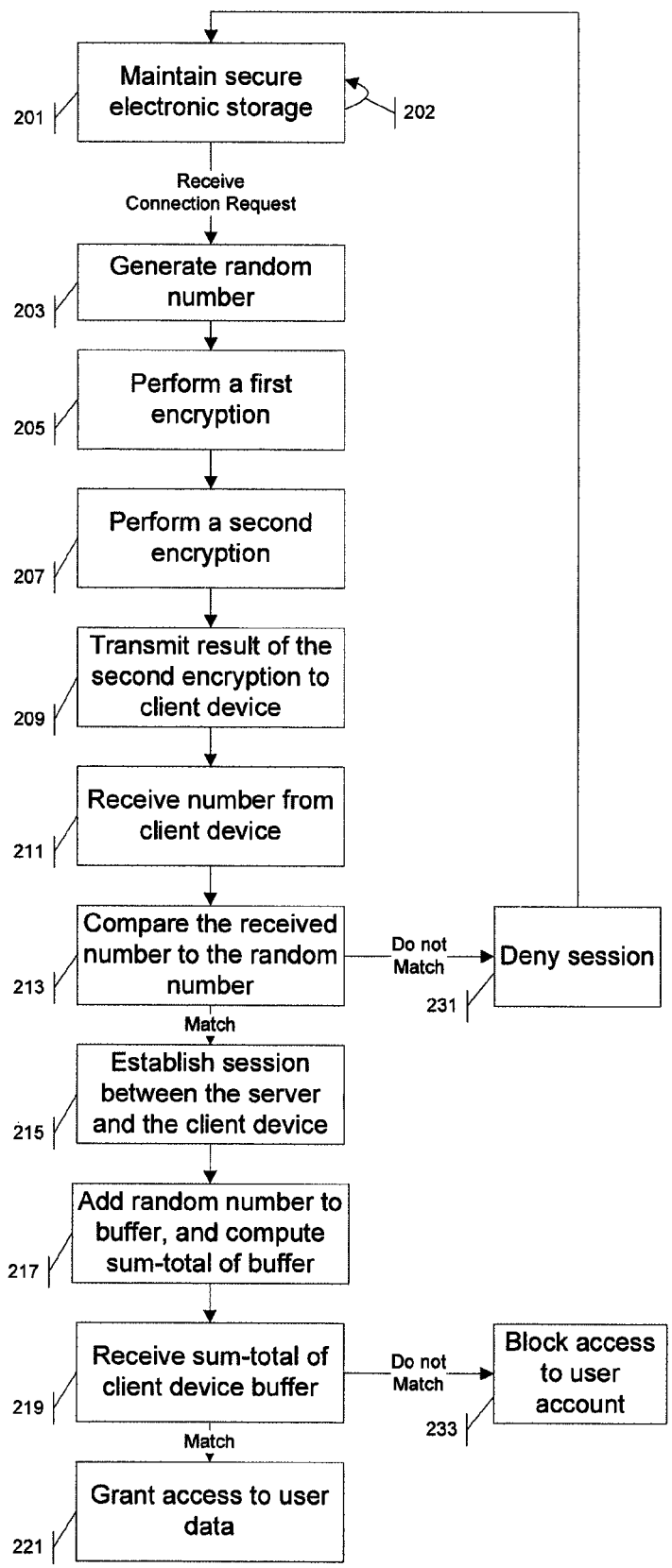
FIG. 3 is a flow diagram illustrating an authentication procedure used by a network accessible server to establish a session with a client device and grant access to a user's data stored on the server.
Figure 4:
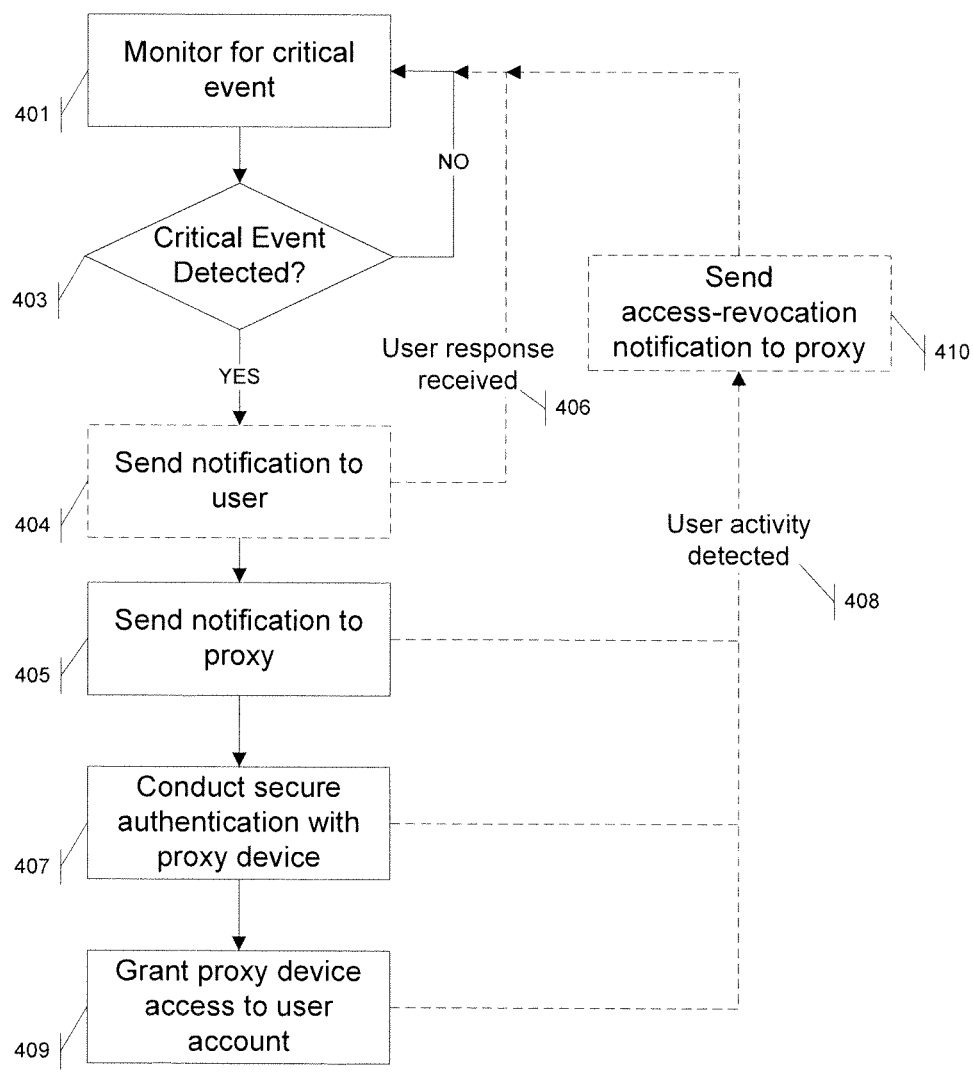
FIG. 4 is a flow diagram illustrating a process for granting access to a user account on the server under a pre-defined condition.

The secure storage and delivery of sensitive user data, as provided by system 10, enables a user having a client device to securely store sensitive user data, and to gain access to the sensitive user data by authenticating the user's client device. In this way, the system provides an electronic equivalent to the safe-deposit box. The system also allows the user to designate one or more proxies and grant access to the stored sensitive data by the one or more proxies when a condition or event matching a pre-defined condition is met. Generally, FIG. 2 illustrates a procedure for creating a user account and configuring a client device for the secure storage of sensitive user data; FIG. 3 illustrates a procedure for authenticating a client device in order to grant access by the client device to sensitive user data stored with the user account; and FIG. 4 illustrates a procedure for monitoring for critical events, notifying a proxy when a critical event is detected, and granting access to the sensitive user data by a client device of a proxy when the critical event is detected.

With reference to FIG. 2, we will now consider the procedure for creating an account for a user associated with a client device on the network accessible server, e.g. for the secure storage service.

The procedure begins at step 101 with the creation of a user account on the network accessible server (e.g., server 31). The creation of the user account is described herein as being performed using a PC terminal 27 having a secure connection to the network accessible server 31, and having a port configured to securely communicate with a client device such as removable storage device 28. For example, a PC terminal located within a facility of the carrier or administrator of server 31, and having a wired connection to the server, can be used to ensure the security of the network connection. The user account creation process can alternatively be performed using other types of terminals 27 (such as a home PC), mobile stations 13a, 13b (such as a user's smartphone), or devices 28a, 28b, over wired or wireless network connections. The creation of the user account can be anonymous, or can require the user to provide identification (such as a passport, driver's license, and/or social security number), biometric information (such as fingerprint or iris scans), or other credentials or identifying information to an administrator of the network server to confirm the user's identity. The confirmation of the user's identity, if required, can be performed in person, out-of-band (e.g., over a telephone line), or over a secured transmission link in order to preserve the user's privacy and ensure the confidentiality of the user's identifying information. Subscription billing information also may be provided, e.g. to bill for the storage service on the user's account with the carrier, to a debit or credit card account, or the like.

Once the user account is created, the server 31 or an associated authentication server generates private/public authentication key pairs for the user account (step 103), and stores the key pairs with the user account information. The server generates a first facility private/public key pair, and a second user private/public key pair. The generated facility public key and user private and public keys are transmitted to a client device 28 of the user for storage on the device. The user's client device 28 can be any device that can store the facility public key and the user private/public key pair, and that can directly communicate over a network, such as for example a mobile station 13 or a terminal 27, or indirectly communicate over the network through a wired or wireless connection with a terminal 27, such as removable storage device 28. In addition to storing the authentication key pairs, the server can store other identifying data for the client device with the user account such as any or all of a serial number, mobile identification number (MIN), mobile directory number (MDN), media access control (MAC) address, unique identifier, or other identifying information for the client device.

After transmitting the appropriate authentication keys to the user's client device 28 and storing the keys on the client device 28, the server 31 can initiate a first identity validation step (step 105). The server 31 generates a random number, and first encrypts the random number with the facility private key. Second, the server 31 encrypts the result of the first encryption of the random number with the user public key. The server 31 transmits the second encryption result (i.e., the double-encrypted random number) to the client device 28. The client device 28 in turn first decrypts the received number with the user private key. Second, the client device 28 decrypts the first decryption result with the facility public key. The client device 28 then transmits the second decryption result back to the server over a secure link, or using encryption with the user private key and/or facility public key. Upon receiving the second decryption result from the client device 28, the server 31 compares the received number with the random number. If the numbers match, the server 31 has confirmed that the client device 28 stores the correct authentication keys and is a trusted device. The server 31 notifies the client device of the confirmation.

If the numbers do not match, the server 31 determines that the client device 28 does not store the correct authentication keys or that the communication link has been compromised. The server 31 can re-transmit the appropriate authentication keys to the user's client device 28 if a secure link is available between the server and client device, and repeat the identity validation (step 105) using the re-transmitted keys. Alternatively, the server 31 can return to step 103 to generate new authentication key pairs prior to repeating step 105, or the server can notify the client device 28 that the communication link cannot be trusted and require that a secure communication link with the client device be provided prior to repeating step 105.

A second identity validation step can further be performed. The second identity validation step, in our example, is initiated by the client device 28. In the second identity validation step, the client device 28 generates a second random number, and first encrypts the second random number with the user private key. Second, the client device 28 encrypts the result of its first encryption with the facility public key. The client device 28 transmits its second encryption result (i.e., the double-encrypted second random number) to the server 31. The server 31 in turn first decrypts the received number with the facility private key, and second decrypts the first decryption result with the user public key. The server 31 then transmits the second decryption result back to the client device 28 over a secure link, or using encryption with the facility private key and/or user public key. Upon receiving the second decryption result from the server 31, the client device 28 compares the received number with the second random number. If the numbers match, the client device 28 has confirmed that the server stores the correct authentication keys and is a trusted server. The client device 28 notifies the server of the confirmation. If the numbers do not match, the client device 28 determines that the server 31 does not store the correct authentication keys or that the communication link has been compromised. The client device 28 may re-initiate the second identity validation step, may request that the encryption keys be re-transmitted by the server 31, or may request that new authentication key pairs be generated and flow return to step 103 when the numbers do not match. The second identity validation step can be completed concurrently with the first identity validation step, or sequentially before or after the first identity validation step.

In addition to validating the identities of the client device and server (step 105), the secure storage method can involve a link history validation step used to determine whether either the client device 28 or server 31 has been the victim of a fraudulent access attempt. History of link security can be tracked, analyzed, and confirmed in a number of ways. In the example, the link history validation relies on the user's client device 28 and the user's account on the server 31 storing respective buffers in which identical random numbers are stored each time a communication session is established between the user's client device and user's account on the server. Prior to granting access to the sensitive user data, the client device 28 and server 31 compute the sum-totals of the numbers in their respective buffers, and exchange the resulting sum-totals. If the user's account on the server 31 has only been accessed by the user's client device 28, the contents of the buffers will be identical and the sum-totals will match, indicating that link history between the user's device 28 and user's account on the server 31 is validated. However, if a fraudulent device has previously accessed or is currently attempting to access the user's account on the server 31, or if the user's client device 28 has previously established or is currently establishing a communication session with a fraudulent server, the sum-totals will not match and the client device 28 and server 31 determine that the user account has been compromised.

To enable link history validation (step 107), the server 31 and client device 28 each include a FIFO buffer of the same length capable of storing N numbers (N is a positive integer). If the server 31 and client device 28 confirm their respective identities (step 105) and notify each other of the confirmation, the server 31 stores as a number in its FIFO buffer the sum of the random number it generated as part of step 105 and the number it received and decrypted from the client device 28 (corresponding to the random number generated by the client device 28 as part of the second identity validation step).

Similarly, the client device 28 stores as a number in its FIFO buffer the sum of the random number it generated (as part of the second identity validation step) and the number it received and decrypted from the server 31 (corresponding to the random number generated by the server 31 as part of the identity validation of step 105). The server 31 and client device 28 each compute the sum-total of the values stored in their respective FIFO buffers, and each send the sum-total value to the other. If the locally computed sum-total and the received sum-total match, the server 31 and the client device 28 confirm their shared link history over the last N connections. However, if the locally computed sum-total and received sum-total do not match, at least one of the server 31 and client device 28 has been victim of a fraudulent connection over the last N connections. If the sum-totals do not match, further access to the user account on the server and access by the user's client device 28 to the server 31 is blocked until a network security administrator determines the cause of the discrepancy or performs out-of-band verification of the user, client device 28, and/or server 31.

During account set-up, there may only be one identity validation and link history validation step performed, and the FIFO buffers may only contain one number. However, over time, the buffers will have data for a history of N connections between the server 31 and the particular client device 28.

In examples in which the second identity validation step is not performed, the FIFO buffers in the server 31 and the client device 28 respectively store the random number generated by the server 31 at step 105, and the number received from the server 31 and decrypted in the client device 28 at step 105. The link history validation (step 107) otherwise proceeds as described above by exchanging and comparing the sum-totals of the FIFO buffers in the server 31 and client device 28.

In our secure storage example, the creation of the user account also includes defining a set of conditions or events (also termed a "notification rule") under which access to a user's sensitive data stored in the user's account is granted to the user's one or more proxies (step 109). The set of conditions or events and associated data are stored as configuration data associated with each user's account on the server 31. The set of conditions or events can be pre-defined on the server 31 or user selected or adjusted, and are stored in association with the user account.

To determine whether access to a user's account should be granted to the proxies designated by the user, the server 31 monitors the user's activity on the server 31, and/or on one or more accounts linked to the user's account to determine whether the set of conditions associated with the user account are met. The set of conditions will generally result in the proxies being granted access after a selected period of inactivity by the user, for example a period of 180 consecutive days. The inactivity can be determined from monitoring one or a combination of several types of service related user actions. For example, the user's inactivity can be evaluated based on the user failing to log in to or access the server 31, upload content to the server 31, or download content from the server 31. In another example, user inactivity may be determined upon the user failing to respond to a notification sent to the user by e-mail, telephone, or registered mail within a given response period. With another approach, the server 31 may recognize inactivity from the user failing to log into or access an email, twitter, computer, or other third-party or network account linked to or identified in the user's account on the server 31. These monitored accounts are different from the user's account on the server 31 and may be provided by one or more servers different from the server 31 or by one or more service providers different from the carrier or provider operating server 31. More specific examples of some of these conditions may include granting access to the user's data if the user's twitter account is inactive for more than 30 days, if the user fails to send email through the user's email account for more than 15 days, and/or the user fails to respond within 8 days to an e-mail sent by the server to the user on his or her birthday. Another form of monitored inactivity may take the form of the user failing to engage in any transactions using a bank, service provider, or other account linked to the user's account on the server within a predetermined amount of time. The user's inactivity can also be evaluated based on the user incorrectly responding to a notification sent to the user by e-mail or phone, for example. Other factors, such as a proper death notification, missing person report, or other certificate being submitted to an administrator of the server may result in a set condition being satisfied.

The creation of the user account further includes the designation of one or more proxies for the user (step 111). A proxy can be an heir, attorney, or other person/entity designated by the user and to whom the user would like to grant access to the user's sensitive data upon the pre-defined conditions being met. In one example, the proxy can be legal entity (e.g., a corporation or a law-firm) designated by the user, and the proxy gains access to the data through the actions of a person acting as a representative of the legal entity. Different proxies may be assigned to have access upon occurrence of different conditions, and/or all proxies may be granted access upon occurrence of a specific condition (e.g. a death notice), or all proxies may be equally designated in relation to all conditions. Identifying and/or contact information (e.g., email address, phone number, or home address) for each of the proxies can be stored in association with the user account. The proxy can also be anonymous.

In addition to designating proxies, a client device is configured for each proxy associated with the user's account. The client device for each proxy, also referred to as a proxy device herein, can be any device as described above as being suitable as a client device (e.g., a mobile station 13, a terminal 27, a USB key or storage device 28, etc.). Each proxy device is loaded with the facility public key and the user's user public/private key pair by communicating the authentication keys to the proxy device over a secure connection. Each authentication key is communicated to the proxy device from the server 31, if the server stores the key (e.g., the facility public key), or from the user's client device 28, if the server does not store the key (e.g., in situations in which the server does not store the user private key). In addition to storing the authentication keys on the proxy device, the server 31 can perform an identity and link history validation similar to that described previously in connection with steps 105-107 to validate the proxy device and establish a link history FIFO for the proxy device both in the server 31 and in the proxy device. If a proxy device link history validation is performed, the user account on the server 31 stores a separate FIFO buffer for each user's client device and each proxy's client device associated with the user account. The separate FIFO buffers for the client device 28 and each proxy device can be stored as part of the user account's configuration data on the server 31. In addition, each client device 28 and proxy device will store its own FIFO buffer in its memory.

After generating the key pairs, the server 31 stores the facility private/public key pair and the user private/public key pair as part of the user account's configuration data. After transmitting the user private key to the client devices 28 of the user and the one or more proxies, the server 31 can optionally select a level of encryption security (step 113) to selectively delete the user private key from its own memory. If the user private key is stored with the user account configuration data, data stored in the user account and encrypted using the user public key can be decrypted using the stored user private key. However, if the user private key is not stored with the user account configuration data, data encrypted using the user public key cannot be decrypted using the authentication keys stored on the server 31 as part of the user account's configuration data. Instead, the data encrypted using the user public key can only be decrypted using the user private key stored on the client devices 28 of the user and of the one or more proxies. A user wanting a higher level of data security can select a higher level of encryption security resulting in the user private key being deleted from or not stored on the server 31. Alternatively, a user wanting to be able to decrypt encrypted data even if all client devices 28 storing the user private key are lost, destroyed, or corrupted, can select a lower level of encryption security resulting in the user private key being stored with the user account configuration data on the server 31.

While the user's client device and the proxies' client devices generally store identical sets of encryption/decryption keys, additional authentication key pairs or device-specific key pairs can alternatively be used. For example, device-specific key pairs can provide different user key pairs for each client device used. Device-specific key pairs can also provide different facility key pairs for each client device used. The device-specific key pairs can be used to authenticate the respective client devices 28 with the server 31, to encrypt communications between the respective client devices 28 and server 31, and/or to encrypt data associated with the client device 28 and stored on the server 31. In embodiments in which the sensitive user data stored on the secure storage server 31 is encrypted with the user public key, however, all client devices 28 associated with the user's account generally store the user private key to enable the client devices to decrypt the stored sensitive data. Alternatively, if the user private key is stored on the server 31, the client devices 28 do not need to store the user private key as the devices can retrieve the key from the server 31 if and when the devices are granted access to the sensitive user data. In yet another alternative, the sensitive user data can be encrypted on the server 31 using a common public key, and each of the client devices associated with the user account can store the common private key used to decrypt the sensitive data.

Once the user account is created, the user can begin storing data in the user's account (step 115). In order to ensure greater data security during transmission with the server 31 and during storage on the server 31, all sensitive data to be uploaded to, stored on, and downloaded from the server can be appropriately encrypted user the facility and/or user key pairs. The user can store sensitive user data on server 31, the sensitive user data including data that the user would like to preserve as private until the pre-set conditions are met, and which may be private data, personal data, confidential data, secret data, or other data that the user would like to store on the server 31. The sensitive user data could include data storing a property deed, a will or testament, medical records, a confession, a trade secret, or the like.

Once the user account is created, the user can modify account information, including account configuration data stored on the server 31. For example, after can designate new or additional proxies, revoke one or more proxies' designation, or redefine the pre-set conditions. The user can additionally configure new client devices 28, either for the user's own use or for use by proxies. In addition, the user can notify the server system 31 of an extended absence (e.g., a trip during which the user will not have email access) in order to ensure that the secure storage service does not prematurely grant access to the proxies. In order to modify any account information and/or create and configure new client devices 28, the user may be required to establish a secure connection with the server 31 and repeat procedures described above in connection with FIG. 2.

While the above description describes an implementation with a single client device 28 for the user, a user can have multiple client devices (e.g., a first removable storage client device 28 for use in accessing the user's account through a terminal 27, and a second mobile station client device 13a to allow the user to access the user account through network 15). Similarly, each proxy can have multiple devices. In implementations with multiple devices, the user account configuration data stored by the server 31 includes a unique identifier such as a serial number for each client device associated with the user account, and a separate FIFO buffer for each client device. Each client device stores its own FIFO buffer, and the appropriate set of keys to enable access to the sensitive data.

When a particular client device 28 attempts to access the user account on the server 31, the server 31 determines the client device's unique identifier, and determines whether that client device 28 is currently allowed to access the user account. While a user's client device 28 is usually allowed to access the user account at any time, a proxy's client device may be restricted from accessing the user account and/or the sensitive data associated with the user account until after the pre-set conditions have been met. Upon determining that the particular client device 28 is allowed to access the user account, the server 31 may retrieve the configuration data associated with the client device (e.g., FIFO buffer information associated with the particular client device) in order to authenticate the client device.

FIG. 3 illustrates an authentication process used by the network accessible server to establish a session with a client device and grant access to a user's data stored on the secure storage server. After initial setup of a user account (as described in association with FIG. 2), the authentication process of FIG. 3 may be undertaken each time a user's or a proxy's client device seeks to access the user's account on the server.

The server (e.g., server 31) maintains the secure electronic storage of data (step 201), and remains in this state until it receives a connection request from a client device. Upon receiving a connection request, the server 31 begins an authentication process to confirm the identity of the client device in steps 203-221. The authentication process may be performed on server 31 alone, and/or may be processed using one or more dedicated servers or distributed server systems for performing authentication, user account access, secure storage, and other functions. The authentication process may include steps in addition to those described below, such as steps for verifying that the serial number or other identifier for the client device matches an identifier for an approved client device associated with the user account being accessed on the server, user authentication by identifier and password, etc.

The server begins the authentication process by generating a random number (step 203), encrypting the random number with the facility private key (step 205), encrypting the result of the first encryption with the user public key (step 207), and transmitting the result of the second encryption to the client device (step 209). The client device in turn first decrypts the received number with the user private key, second decrypts the result of the first decryption using the facility public key, and transmits the second decryption result to the facility server. Upon receiving the second decryption result (step 211), the facility server compares the received number with the generated random number (step 213). If the numbers match, the facility server authenticates the client device and establishes a session between the server and the client device (step 215). However, if the numbers do not match, the server determines that the client device does not store the correct encryption/decryption keys and is not authorized for access to the user account. The server, denies the session by the client device (step 231), and returns to step 201.

The identity validation performed at steps 203-213 enable the server to confirm the identity of the client device. The authentication process may include additional steps to enable the client device to confirm the identity of the server by, for example, performing in the client device a process similar to that described in steps 203-213. In particular, the process can include the steps of generating a random number in the client device, first encrypting the generated random number using the user private key, encrypting the result of the first encryption using the facility public key, and transmitting the resulting double-encrypted number to the server. The server in turn first decrypts the received number using the facility private key, decrypts the result of the first decryption using the user public key, and transmits the second decryption result to the client device. Upon receiving the second decryption result, the client device compares the received number with the random number it generated to determine whether the server stores the correct facility and user keys. If the numbers match, the client device can transmit a notification to the server indicating that the client device's authentication of the server was successful.

As part of establishing the session between the server and the client device (step 215), the server transmits a notification to the client device indicating that the authentication was successful. In addition, if the client device's authentication of the server was successful, the server receives a notification from the client device indicating the client device successfully authenticated the server. The server then stores the sum of the random number it generated at step 203, and the number it received from the client device and decrypted, in the FIFO buffer associated with the user account of the user of the client device, and computes the sum-total of the resulting FIFO buffer (step 217). Meanwhile, in response to receiving the notification indicating that the authentication was successful, the client device stores the sum of the random number it generated, and the number it received from the server and decrypted, in its FIFO buffer; computes the sum-total of numbers stored in the resulting FIFO buffer; and transmits the sum-total to the server. Upon receiving the sum-total from the client device (step 219), the server compares the received sum-total to the sum-total computed locally at step 217. If the sum-totals match, the link history between the server and the client device is confirmed, and the server grants the client device access to the user data stored in the user account (step 221). Once access is granted, the client device can upload to, download from, and transfer data within the user account.

However, if the sum-totals do not match, the server determines that a fraudulent connection to the user account or to the client device has taken place, and the server blocks access to the user account (step 233). A security administrator's intervention may be necessary to unblock the user account. The security administrator may, in particular, seek to determine whether a fraudulent client device has previously established a connection with the user account, whether the current client device is a fraudulent client device attempting to gain access to the user account, or whether the current client device has previously established a connection with a fraudulent facility server. The security administrator may require out-of-band verification of the client device and/or the server before unblocking or re-enabling the user account.

FIG. 4 illustrates a process for monitoring, detecting an event, and granting access to a user account on the server system by a client device of a proxy of the user under the pre-defined event condition.

The server maintains the secure electronic storage, and allows the client device of the user to access the user account upon proper authentication (e.g., using the authentication described in relation to FIG. 3 above). During this time, the facility server 31 monitors the user's activity according to the pre-defined conditions associated with the user account (step 401). The server may perform the monitoring continuously, periodically (e.g., on an hourly, weekly, monthly, or other scheduled basis), or in response to a prompt or request for monitoring from a server, a system administrator, a proxy, or other device or entity. While the monitoring server functionality is performed by the server 31 in our example, the monitoring can also be performed by a dedicated monitoring server in communication with server 31, or by a distributed server system running a distributed monitoring server application.

As part of the monitoring, the monitoring server application retrieves the information on the set of conditions under which access to a user's sensitive data is granted to the user's one or more proxies, for example by accessing configuration data associated with the user account and storing the pre-set conditions defining critical events. The monitoring of the user's activity in accounts operated by third parties, such as email, twitter, computer, or other network accounts, may be performed by the server 31 contacting third-party servers to inquire about the user's activity on those servers, or by the server 31 receiving a notification from a third-party server when the user logs in to the third-party's server (or, alternately, when the user fails to log in to the third-party's server for a selected period of time).

As long as the pre-defined conditions are not met (step 403, "No"), no event warranting a report or proxy access is detected, and the facility continues monitoring user activity for the pre-defined conditions (step 401). In our example, the pre-defined conditions are those defined at step 109 during account set-up (see description of FIG. 2 above). The pre-defined conditions may not be met, for example, if a user regularly accesses the user account, actively uses an e-mail or twitter account linked to the user account, and/or promptly responds to notifications received from the facility server. However, if the user goes missing, passes, or otherwise becomes inactive, one of the monitored critical events occurs and one or more of the pre-defined conditions will be met (step 403, "Yes").

Upon detecting that any of the pre-defined conditions is met (step 403, "Yes"), the server transmits a notification to the one or more proxies identified with the user account (step 405). The notification is sent using the contact information for each proxy stored with the configuration data of the user account, and can be sent by SMS, by e-mail, by postal or registered mail, by other appropriate means based on the type of contact information, or by any combination of these notification transmittal techniques. The notification can include instructions for each proxy detailing access procedures for gaining access to the user account on the server. Once the notification has been sent, the one or more proxies are permitted access to the user account on the server using their respective proxy client device.

Upon receiving a connection request from a proxy device associated with a user account having undergone a critical event, the server conducts an authentication procedure for the proxy device (step 407). The authentication procedure can be substantially similar to the authentication procedure used to authenticate the client device and described in relation to FIG. 3 above. If the authentication procedure is successful, the proxy's client device is granted access to the user account, and to the sensitive user data associated with the user account and stored on the server (step 409).

Upon detecting that the pre-defined conditions associated with a user account are met (step 403, "Yes"), the server can also optionally transmit a notification to the user of the user account (step 404) indicating that the pre-defined conditions have been met and that proxies' client devices may therefore be granted access to the user account. If the user responds to the notification (step 406) or accesses the user account (step 408) after the notifications have been sent to the user and/or proxies, the proxies' access to the user account may be blocked and server operation may return to step 401 to resume monitoring for a critical event. Alternatively, the server can continue monitoring for critical events even after a critical event has been detected and, if any of the pre-defined conditions are broken (e.g., if the user logs on to a user email account associated with the user's account on the server) or if user activity is otherwise detected (step 408), the server can revoke the proxies' access permissions to the user account and return to step 401. In such a case, for convenience to the proxies, additional notices may be sent to inform the proxies that their access privileges have been revoked in view of the more recent activity of the account holder user (step 410).

As shown by the above discussion, functions relating to the secure electronic storage service may be implemented on computers connected for data communication via the components of a packet data network, operating as a client device and/or as a standalone server, multi-server system, or distributed server system as shown in FIG. 1. Although special purpose devices may be used, such devices also may be implemented using one or more hardware platforms intended to represent a general class of data processing device commonly used to run "server" programming so as to implement the secure electronic storage functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the secure electronic storage service. The software code is executable by the general-purpose computer that functions as the standalone or distributed application server system and/or that functions as a client or user terminal device. In operation, the code is stored within the general-purpose computer platform. At other times, however, the software may be stored at other locations and/or transported for loading into the appropriate general-purpose computer system. Execution of such code by a processor of the computer platform or by distributed processors across one or more distributed computer or server platforms enables the platform(s) to implement the methodology for providing the secure electronic storage service, in essentially the manner performed in the implementations discussed and illustrated herein.

Figures 5, 6:
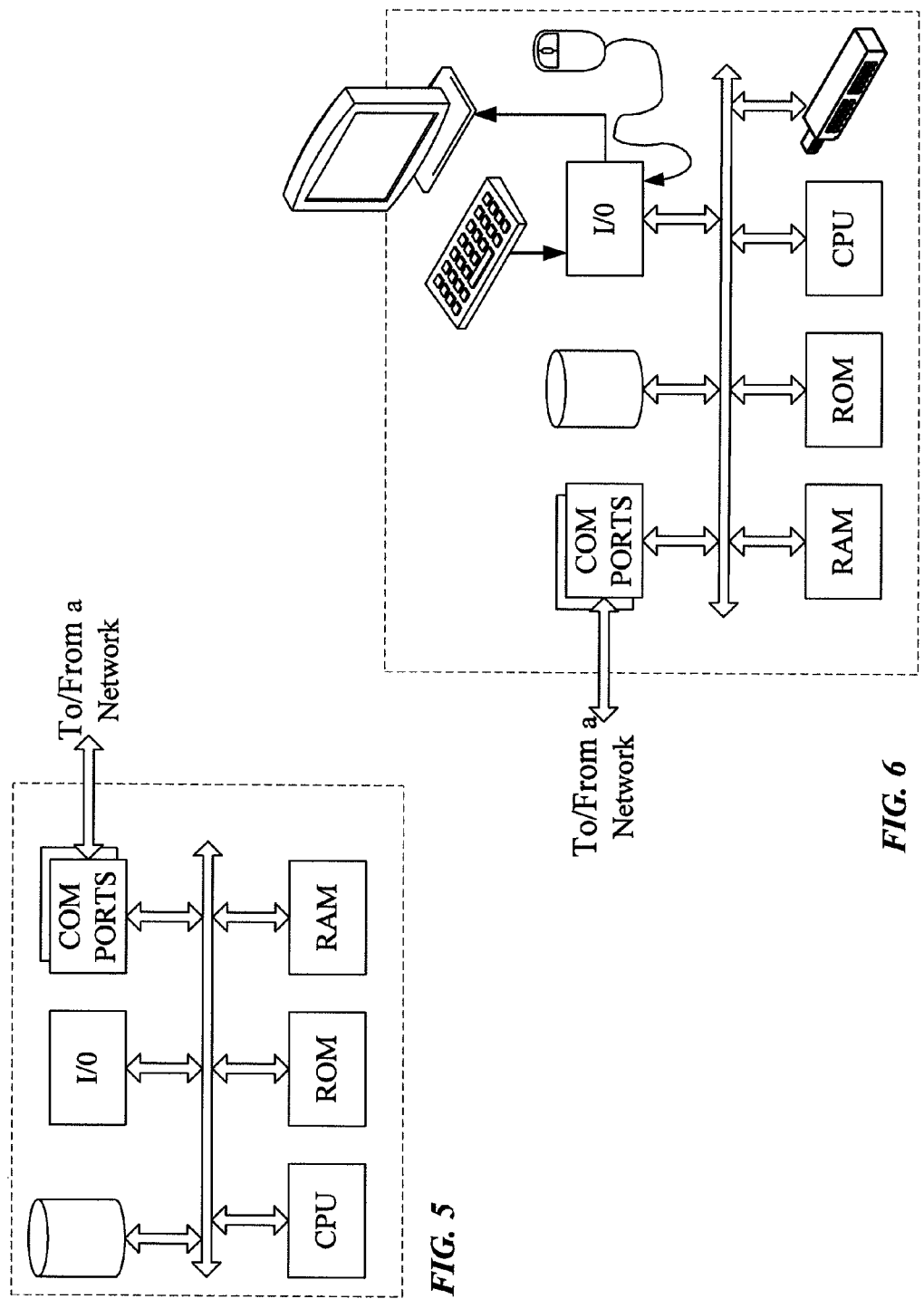
FIG. 5 is a simplified functional block diagram of a computer that may be configured as a host or server, for example, to function as the application and/or authentication server in the system of FIG. 1.
FIG. 6 is a simplified functional block diagram of a personal computer or other work station or terminal device.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of the secure electronic storage service outlined above may be embodied in programming. Program aspects of the technology may be thought of as "products" or "articles of manufacture" typically in the form of executable code and/or associated data that is carried on or embodied in a type of non-transitory machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the service provider into the computer platform of the facility or application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the secure electronic storage service, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising steps of:
   maintaining a secure electronic storage of sensitive user data in a network accessible server;
   storing data, in a manner available to the server, identifying a proxy for the user;
   monitoring user access to the sensitive user data in the secure electronic storage;
      based on the monitoring, detecting a condition or event based on the user access of the server matching a pre-defined notification rule; and
   upon detecting said condition or event:
      (a) generating and sending a notification message through the network to a client device of the identified proxy;
      (b) conducting a secure communication procedure between the server and the client device, to validate the client device as a device of the identified proxy; and
      (c) upon successful validation of the identified proxy, granting the client device access through the network to the sensitive user data in the secure electronic storage,
   wherein at least one of:
   a) detecting said condition or event includes at least one of:
      detecting that the user has not accessed the data in the secure electronic storage during a first determined period of time, or
      detecting that the user has failed to respond to a notification message sent by the network accessible server within a second predetermined period of time, or
   b) the method further comprises storing user configuration data including identification of a third-party account associated with the user, wherein the detecting a condition or event matching a pre-defined notification rule includes detecting that the user has not accessed the third-party account during a determined period of time.

2. The method of claim 1, wherein step (b) comprises steps of:
   generating a random number responsive to an attempt to access the sensitive user data in the secure electronic storage from a client device;
   performing a first encryption, by encrypting the random number with a first key of a first key pair;
   performing a second encryption, by encrypting a result of the first encryption with a first key of a second key pair;
   transmitting a result of the second encryption via the network to the client device;
   receiving a number via the network from the client device; and
   upon determining that the received number and the random number match, which indicates that the client device decrypted the result of the second encryption using the second keys of the first and second key pairs to recover the random number, establishing a communication session through the network between the server and the client device, for the client device to access the sensitive user data in the secure electronic storage.

3. The method of claim 2, wherein:
the first key of the first key pair is a private key of the server, and the second key of the first key pair is a public key of the server; and
the first key of the second key pair is a public key of the user, and the second key of the second key pair is a private key of the user.

4. The method claim 2, further comprising steps of:
storing a value based on the random number in a buffer storing values based on random numbers generated during successful attempts to access the sensitive user data in the secure electronic storage from the client device, and adding the values stored in the buffer to form a first sum;
receiving from the client device, a second sum of numbers based on numbers decrypted during successful attempts to access the sensitive user data in the secure electronic storage from the client device; and
granting the client device access to the sensitive user data in the secure electronic storage via the established communication session upon determining that the second sum matches the first sum.

5. The method of claim 2, further comprising steps of:
receiving a double-encrypted number via the network from the client device;
performing a first decryption, by decrypting the double-encrypted number with the first key of the second key pair;
performing a second decryption, by decrypting a result of the first decryption with the first key of the first key pair;
transmitting a result of the second decryption via the network to the client device; and
receiving a notification from the client device indicating that the result of the second decryption matched the number that was double-encrypted.

6. The method of claim 5, further comprising steps of:
storing a value based on at least one of the random number and the result of the second decryption in a buffer storing values generated during successful attempts to access the sensitive user data in the secure electronic storage from the client device, and adding the values stored in the buffer to form a first sum;
receiving from the client device, a second sum of numbers based on at least one of numbers decrypted in the client device and random numbers generated in the client device during successful attempts to access the sensitive user data in the secure electronic storage from the client device; and
granting the client device access to the sensitive user data in the secure electronic storage via the established communication session upon determining that the second sum matches the first sum.

7. The method of claim 5, further comprising steps of:
storing a value based on the sum of the random number and the result of the second decryption in a buffer storing values generated during successful attempts to access the sensitive user data in the secure electronic storage from the client device, and adding the values stored in the buffer to form a first sum-total;
receiving from the client device, a second sum-total of numbers based on sums of numbers decrypted in the client device and random numbers generated in the client device during successful attempts to access the sensitive user data in the secure electronic storage from the client device; and
granting the client device access to the sensitive user data in the secure electronic storage via the established communication session upon determining that the second sum-total matches the first sum-total.

8. The method of claim 1, wherein the detecting a condition or event matching a pre-defined notification rule includes at least one of:
detecting that the user has not accessed the data in the secure electronic storage during a first determined period of time; or
detecting that the user has failed to respond to a notification message sent by the network accessible server within a second predetermined period of time.

9. The method of claim 1, further comprising:
storing user configuration data including identification of a third-party account associated with the user;
wherein the detecting a condition or event matching a pre-defined notification rule includes detecting that the user has not accessed the third-party account during a determined period of time.

10. A network accessible server system for the secure storage of sensitive user data, the system comprising:
a data communication interface for communication through a network with a client device;
a processor coupled to the data communication interface;
at least one storage device accessible by the processor;
a secure storage area in the at least one storage device for securely storing sensitive user data; and
programming in the at least one storage device for the processor, wherein execution of the programming by the processor configures the network accessible server system to perform functions, including functions to:
store data in the storage device, in a manner available to the processor, identifying a proxy for the user;
monitor user access to the sensitive user data in the secure electronic storage;
based on the monitoring,
detect a condition or event based on the user access of the network accessible server system matching a pre-defined notification rule; and
upon detecting said condition or event:
(a) generate and send a notification message through the data communication interface to a client device of the identified proxy;
(b) conduct a secure communication procedure between the server and the client device, to validate the client device as a device of the identified proxy; and
(c) upon successful validation of the identified proxy, grant the client device access through the network to the sensitive user data in the secure electronic storage,
wherein at least one of:
a) detecting said condition or event includes at least one of:
detecting that the user has not accessed the data in the secure electronic storage during a first determined period of time, or
detecting that the user has failed to respond to a notification message sent by the network accessible server within a second determined period of time, or
b) the method further comprises storing in the at least one storage device user configuration data including identification of a third-party account associated with the user, wherein the detecting a condition or event matching a pre-defined notification rule includes detecting that the user has not accessed the third-party account during a determined period of time.

11. The system of claim 10, wherein execution of the programming configures the network accessible server system to perform function (b) to include functions to:

generate a random number responsive to an attempt to access the sensitive user data in the secure electronic storage from a client device;
perform a first encryption, by encrypting the random number with a first key of a first key pair;
perform a second encryption, by encrypting a result of the first encryption with a first key of a second key pair;
transmit a result of the second encryption via the network to the client device;
receive a number via the network from the client device; and
upon determining that the received number and the random number match, which indicates that the client device decrypted the result of the second encryption using the second keys of the first and second key pairs to recover the random number, establish a communication session through the network between the server and the client device, for the client device to access the sensitive user data in the secure electronic storage.

12. The system of claim 11, wherein:
the first key of the first key pair is a private key of the server, and the second key of the first key pair is a public key of the server; and
the first key of the second key pair is a public key of the user, and the second key of the second key pair is a private key of the user.

13. The system of claim 11, wherein execution of the programming further configures the network accessible server system to perform functions to:
store a value based on the random number in a buffer storing values based on random numbers generated during successful attempts to access the sensitive user data in the secure electronic storage form the client device, and add the values in the buffer to form a first sum;
receive from the client device, a second sum of numbers based on numbers decrypted during successful attempts to access the sensitive user data in the secure electronic storage from the client device; and
grant the client device access to the sensitive user data in the secure electronic storage via the established communication session upon determining that the second sum matches the first sum.

14. The system of claim 11, wherein execution of the programming further configures the network accessible server system to perform functions to:
receive a double-encrypted number via the network from the client device;
perform a first decryption, by decrypting the double-encrypted number with the first key of the second key pair;
perform a second decryption, by decrypting a result of the first decryption with the first key of the first key pair;
transmit a result of the second decryption via the network to the client device; and
receive a notification from the client device indicting that the result of the second decryption matched the number that was double-encrypted.

15. The system of claim 14, wherein execution of the programming configures the network accessible server system to perform function (b) to include functions to:
store a value based on at least one of the random number and the result of the second decryption in a buffer storing values generated during successful attempts to access the sensitive user data in the secure electronic storage from the client device, and adding the values stored in the buffer to form a first sum;
receive from the client device, a second sum of numbers based on at least one of numbers decrypted in the client device and random numbers generated in the client device during successful attempts to access the sensitive user data in the secure electronic storage from the client device; and
grant the client device access to the sensitive user data in the secure electronic storage via the established communication session upon determining that the second sum matches the first sum.

16. The system of claim 14, wherein execution of the programming configures the network accessible server system to perform function (b) to include functions to:
store a value based on the sum of the random number and the result of the second decryption in a buffer storing values generated during successful attempts to access the sensitive user data in the secure electronic storage from the client device, and adding the values stored in the buffer to form a first sum-total;
receive from the client device, a second sum-total of numbers based on sums of numbers decrypted in the client device and random numbers generated in the client device during successful attempts to access the sensitive user data in the secure electronic storage from the client device; and
grant the client device access to the sensitive user data in the secure electronic storage via the established communication session upon determining that the second sum-total matches the first sum-total.

17. The system of claim 10, wherein the detecting a condition or event matching a pre-defined notification rule includes at least one of:
detecting that the user has not accessed the data in the secure electronic storage during a first determined period of time; or
detecting that the user has failed to respond to a notification message sent by the network accessible server within a second determined period of time.

18. The system of claim 10, wherein execution of the programming further configures the network accessible server system to perform functions to:
store in the at least one storage device user configuration data including identification of a third-party account associated with the user;
wherein the detecting a condition or event matching a pre-defined notification rule includes detecting that the user has not accessed the third-party account during a determined period of time.

* * * * *